(12) United States Patent
Campbell

(10) Patent No.: US 8,548,907 B1
(45) Date of Patent: Oct. 1, 2013

(54) SYSTEM FOR CONVERTING PAPER MONEY ORDERS TO ELECTRONIC MONEY ORDERS

(76) Inventor: Derrick Harlan Campbell, Brentwood, MD (US)

(*) Notice: Subject to any disclaimer, the term of this patent is extended or adjusted under 35 U.S.C. 154(b) by 23 days.

(21) Appl. No.: 13/348,616

(22) Filed: Jan. 11, 2012

Related U.S. Application Data

(60) Provisional application No. 61/461,002, filed on Jan. 11, 2011.

(51) Int. Cl.
*G06Q 40/00* (2012.01)

(52) U.S. Cl.
USPC .......................................................... 705/40

(58) Field of Classification Search
USPC .......................................................... 705/44
See application file for complete search history.

(56) References Cited

U.S. PATENT DOCUMENTS

| | | | |
|---|---|---|---|
| 5,717,868 A | 2/1998 | James | |
| 7,110,978 B1 | 9/2006 | Chin | |
| 7,349,884 B1 | 3/2008 | Odom et al. | |
| 7,613,653 B2 | 11/2009 | Milberger et al. | |
| 7,620,603 B2 | 11/2009 | Gilder et al. | |
| 7,660,771 B2 | 2/2010 | Orcutt | |
| 7,753,267 B2 | 7/2010 | Hansen et al. | |
| 7,849,015 B2* | 12/2010 | Opiela et al. | 705/50 |
| 7,909,237 B2 | 3/2011 | Tredeau et al. | |
| 7,959,069 B2 | 6/2011 | Phillips et al. | |
| 8,355,967 B2* | 1/2013 | DeBie et al. | 705/30 |
| 2002/0065666 A1 | 5/2002 | Zorrila De San Martin Soto | |
| 2005/0097046 A1* | 5/2005 | Singfield | 705/42 |
| 2006/0086783 A1* | 4/2006 | Tredeau et al. | 235/379 |
| 2009/0144123 A1* | 6/2009 | Malov et al. | 705/10 |
| 2011/0040602 A1* | 2/2011 | Kurani | 705/10 |
| 2011/0071914 A1* | 3/2011 | Beasley et al. | 705/21 |

FOREIGN PATENT DOCUMENTS

JP 63-41920 2/1988

OTHER PUBLICATIONS

What Is an Electronic Money Order?, http://www.wisegeek.com/what-is-an-electronic-money-order.htm, accessed on Sep. 4, 2011.

\* cited by examiner

*Primary Examiner* — Jessica Lemieux
(74) *Attorney, Agent, or Firm* — Swift & Swift; Stephen Christopher Swift

(57) ABSTRACT

A system and method for converting any and all types of paper money orders into electronic money orders, for retrieval subject to authorization. It allows a customer to make online purchases of goods and services, or pay bills, with an electronic money order. Electronic money orders can be used by a customer online to purchase goods and services from online vendors. The customer will be able to keep his or her electronic money order account active by adding any and all types of paper money orders to the account.

20 Claims, 6 Drawing Sheets

SYSTEM FOR CONVERTING PAPER MONEY ORDERS TO ELECTRONIC MONEY ORDERS

CROSS REFERENCE TO RELATED APPLICATION

This application is based on and claims the benefit of Provisional Patent Application Ser. No. 61/461,002, filed Jan. 11, 2011, which is incorporated herein by reference.

BACKGROUND OF THE INVENTION

1. Field of the Invention

The present invention relates to a system for converting paper money orders to electronic money orders which can be used to make online payments.

2. Description of the Prior Art

There are prior inventions for systems of electronic payment, but none that are equivalent to the present invention. The current paper money order process may be summarized as follows:

Customer goes to a vendor or retailer of paper money orders.

Vendors and retailers of paper money orders are Giant, Safeway, Shoppers, 7-Eleven, banks, check cashing outlets, neighborhoods supermarkets, liquor stores, and convenience stores. Basically paper money orders can be purchases in a variety of locations.

Customer purchases a paper money order.

Note: a paper money order costs about $0.00 to about $2.00 depending on the vendor or retailer.

Paper money orders come in denominations as small as under $1.00 to as high as 1,000.00.

Despite the denomination purchased the cost varies between $0.00 and $2.00.

Note: paper money orders are used by sections of society to pay bills such as rent, taxes, fees, electric, gas, tuition, and fines. Basically paper money orders are used to pay a variety of bills.

When paper money orders are purchased and printed out at a vendor or retailer location there are tracking and tracing numbers on the front and back of the paper money order that identify the vendor or retailer location, the paper money order company and bank, and the dollar value of the paper money order.

There are a number of paper money order companies: such as Global Express, Western Union, and Money Gram to name a few.

U.S. Pat. No. 5,717,868, issued on Feb. 10, 1998, to David L. James, discloses an electronic payment interchange concentrator, which may be used for money orders (see claim 55, column 15). It does not include the generation of unique account numbers for money orders, as in the instant invention.

U.S. Pat. No. 7,110,978, issued on Sep. 19, 2006, to Stephen Chin, discloses an Internet-based money order system, which is connected to an auction for goods, and requires the entry of credit card information (see claim 1, column 5). The instant invention is distinguishable, in that it is not connected to an auction for goods, and does not require the entry of credit card information.

U.S. Pat. No. 7,349,884, issued on Mar. 25, 2008, to Pat Odom et al., discloses a method for processing bill payment at a point of sale location, which may be used to purchase money orders. The instant invention is distinguishable, in that it uses information from a previously purchased paper money order, and generates a customer account number for money orders only.

U.S. Pat. No. 7,613,653, issued on Nov. 3, 2009, to Susan M. Milberger et al., discloses a method for transferring a credit amount out of an online system using a money order. It may involve creating a temporary stored value fund (see claim 8, column 14). Again, the instant invention is distinguishable, in that it uses information from a previously purchased paper money order, and generates a customer account number for money orders only.

U.S. Pat. No. 7,620,603, issued on Nov. 17, 2009, to Clark S. Gilder and Michael G. Lalonde, discloses systems and methods using paperless "Check 21" items. The instant invention is distinguishable, in that it uses information from a previously purchased paper money order, and generates a customer account number for money orders only.

U.S. Pat. No. 7,660,771, issued on Feb. 9, 2010, to Laura Lee Orcutt, discloses a technique for automatically converting checks to ACH debits. It does not apply to money orders (see column 4, lines 55-62).

U.S. Pat. No. 7,753,267, issued on Jul. 13, 2010, to Kurt Hansen and Thomas Sayor, discloses "in-lane" (while shopping at a retail outlet) money transfer systems and methods. The instant invention is distinguishable, in that it uses information from a previously purchased paper money order, and generates a customer account number for money orders only.

U.S. Pat. No. 7,849,015, issued on Dec. 7, 2010, to Michael S. Opiela and Ronald E. Garey, discloses an electronic postal money order method and system. The instant invention is distinguishable, in that it uses information from a previously purchased paper money order, and generates a customer account number for money orders only.

U.S. Pat. No. 7,909,237, issued on Mar. 22, 2011, to Todd Tredeau and Vasil Kostov, discloses a monetary transaction system and method having an internet interface. The instant invention is distinguishable, in that it uses information from a previously purchased paper money order, and generates a customer account number for money orders only.

U.S. Pat. No. 7,959,069, issued on Jun. 14, 2011, to Cheryl Phillips and David Smith, discloses systems and methods for electronically processing check transactions via a location-base device. "Check" includes money orders (see column 7, lines 12-16). The instant invention is distinguishable, in that it uses information from a previously purchased paper money order, and generates a customer account number for money orders only.

U.S. Patent Application Publication No. 2002/0065666, published on May 30, 2002, to Jose Ignacio Zorrila De San Martin Soto, discloses a method and system for transferring money orders, including the transmittal of transaction data from a pre-paid money order receipt. The instant invention is distinguishable, in that it generates a customer account number for money orders only, and allows the customer to use the account number for multiple money orders.

U.S. Patent Application Publication No. 2005/0097046, published on May 5, 2005, to Joy Shantia Singfield, discloses a wireless electronic check (and money order) deposit scanning and cashing machine, with a web-based online account cash management computer application system. The instant invention is distinguishable, in that it generates a customer account number for money orders only, and allows the customer to use the account number for multiple money orders.

Japanese Patent No. 63-41920, published on Feb. 23, 1988, inventors Takaharu Kishimoto and Masaharu Shigeoka, discloses an information inputting system for a money order terminal.

What Is an Electronic Money Order?, hppt://www.wiseg-eek.com/what-is-an-electronic-money-order.htm (accessed on Sep. 4, 2011) shows that the concept of an individual money holding account for electronic money orders is known, but unlike in the instant invention, a paper document is still created when the money order is sent.

None of the above inventions and patents, taken either singly or in combination, is seen to describe the instant invention as claimed.

SUMMARY OF THE INVENTION

The present invention is a process for converting a paper money order to an electronic money order for online use, which may be summarized as follows:

Customer takes the paper money order he purchased and logs onto a secure website.

The customer finds an image or picture of the type of paper money order he purchased.

The customer clicks on the image or picture of the paper money order he purchased.

The customer enters the tracking and tracing information of the paper money order he has in his hands and the dollar amount.

Accounts are created (opened) with a threshold dollar amount.

A minimal balance amount must be available in the account on a monthly basis to keep the account active.

Note: the customer will be guided by the example on the screen as to where on the paper money order to find the tracking and tracing information.

After the customer enters the tracking and tracing information and the dollar amount, an account number is generated for the customer.

The customer is then instructed to create a user profile.

The customer is given the option to create their own level of personal information they want on the web.

An electronic money order will only require limited personal information and an account number for online use.

After creating a user profile the customer is prompted to answer some security questions in the event they forget their user ID and password.

Funds in an electronic money order account are available down to the minimal balance amount until spent. At the minimal balance amount the account is temporarily frozen but the customer can reactive.

The customer is charged a one-time fee for creating his user account and a yearly maintenance fee (providing funds are still available).

When funds in a user account are spent and go down to a minimum balance, the account becomes inactive or temporarily frozen.

Customers can keep their account active by adding money.

Customers can purchase any other type of a paper money order to add money to their account.

Paper money orders of different brands can be used to add money to an active account or to a frozen or inactive account.

Customers are charged a fee to add money to their account.

Note: once a paper money order has been used to create or update an account it cannot be reused for another purpose.

Funds may be deposited in the secure electronic money order website company's bank.

The electronic money order website company's bank clears the money order with the paper money order company's bank (such as the banks of Global Express, Western Union, and Money Gram).

Funds are settled with both banks before becoming available to the customer.

Now the customer can use his electronic money order account to make online purchases. Note: customers can check their account cash balance at any time.

Electronic money orders will be a viable pay option for customers who purchase items from merchants, retailers, and vendors who sell online. E-money order can also be used to pay bills online.

Customer goes to an online merchant, retailer, or vendor website, or a utility or service company website.

Customer purchases a product or pay for a service.

When comes time to pay, the customer selects the electronic money order logo.

The customer puts in his electronic money order account number and submits to pay.

Once there sufficient funds available the payment is cleared.

Converting a paper money order to an electronic money order for online use includes the following steps:

Tracking numbers on paper money orders are entered into fields in parallel rows.

Fields are structured to accommodate a number of alpha numeric characters.

Dollar amount of paper money order is entered into a field that is set up to accept currency only.

After all the data are entered, there is a prompt to submit.

An account number is returned.

The account number is linked to the tracking and tracing numbers.

Accessing the account number points to tracking and tracing numbers stored in database.

Accordingly, it is a first object of the invention to provide an improved system for converting paper money orders to electronic money orders.

It is a second object of the invention to provide a means for securely purchasing goods and services from online vendors.

It is a third object of the invention to provide a means to minimize the personal information required to obtain electronic money orders and make online purchases.

It is a fourth object of the invention to provide means to reduce the risk of identity theft.

It is a fifth object of the invention to provide a payment means that is much faster than using paper checks or paper money orders, but less expensive than credit cards.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
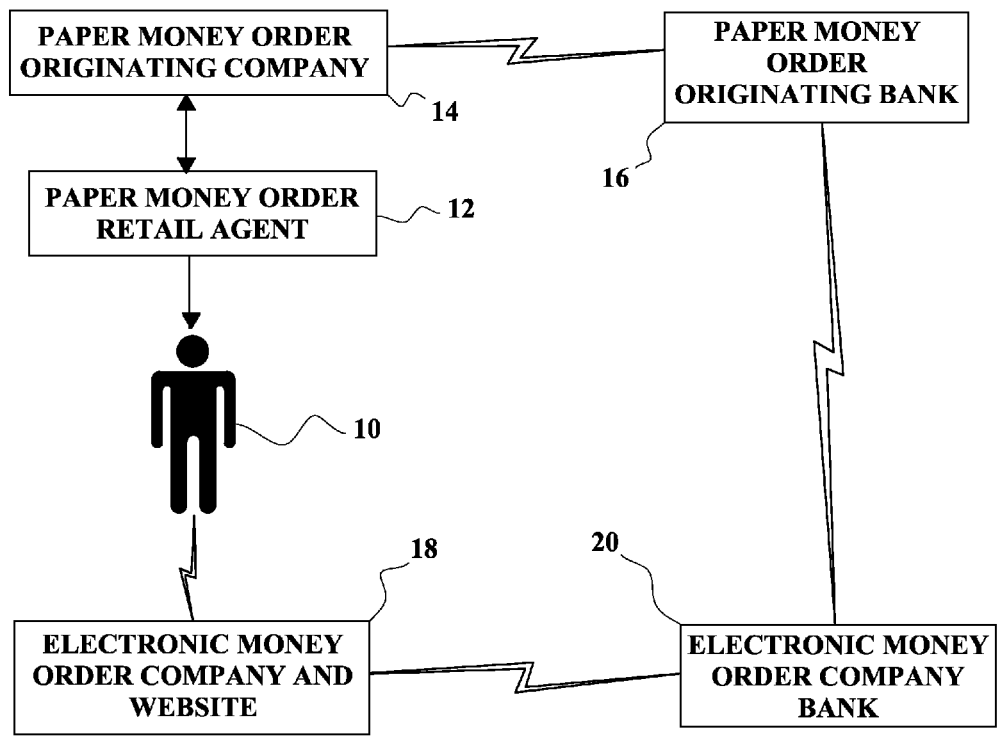
FIG. 1 is a graphical representation of the overall concept of the invention.

The present invention differs from any existing software in the "set of statements or instructions used" in the process.

This invention will be different as follows: A user/customer enters (data) such as: the dollar value, the tracking number, and the tracing number found on a paper money order into predetermined fields. After the user/customer is finished, the user/customer "hits" a submit button. The "set of statements or instructions used" operate on the data resulting in a stored, reusable, and retrievable account number.

The method I plan to use to convert paper money orders into electronic money orders is described below.

A paper money order becomes a "quasi" electronic money order by having the dollar value of a paper money order now available online through the account number.

To understand this process better let us revisit how paper money orders are currently used to pay bills. Let us look at the following example. A person goes to a brick and mortar retailer and buys a paper money order to pay his cable television bill. The person fills out the front of the paper money order and mails it to the cable television company. The paper money order funds are secured or backed by the paper money order originating company's bank not the paper money order retailer. The paper money order retailer is an agent of the paper money order originating company. Some examples of paper money order originating companies are Global Express, Money Gram and Western Union to name a few. Banks also sell paper money orders directly to customers. In essence a bank can play all the roles—bank, originating company, and retailer. Retailers or agents of paper money order originating companies are Giant, Safeway, Shoppers, mom and pop stores, 7-elevens, convenience stores and bodegas to name a few.

Let us return to our example. The cable television company receives the paper money order payment and deposits it into their bank. The cable television company's bank presents the paper money order (just like a paper check) to the paper money order originating company bank for payment. Since the funds are secured or backed the funds are cleared and payment is made.

Let us assume that after the person mailed his payment it was "lost" in the mail. The cable television company claimed that they never received it. When a customer purchases a paper money order from a brick and mortar retailer (an agent) the paper money order comes in two joined sections: the money order and the receipt stub. The sections are separated by a perforated line. The stub references the dollar value of the money order and the tracking and tracing information. Customers are advised to keep the stub for their records. So, if the cable television company never received the payment, the customer can put a trace on the paper money order by contacting the paper money order originating company or going to their website.

Let us now return to my method to convert a paper money order into an electronic money order. The user/customer will be "paying" a fee or a percentage of the face value of the paper money order to have those funds available online through the account number. My process gives a user/customer access to application software via a website where the data entered by the user/customer is operated on by a "set of statements or instructions" which results in a stored, reusable, and retrievable account number.

How does the process of converting a paper money order to an electronic money order differ from the process of creating an online electronic check? There are two forms of electronic checks. One form uses an Internet-only-transfer, and the other begins with a paper check that converts to an electronic check, or e-check. A paper check requires the following information: the date, the amount of the check, a valid signature, the routing or address of the bank where the withdrawal is being made and the account number of the individual writing the check. Once initiated, the trade involves converting the information into electronic form, sending the data, verifying the data and receiving confirmation of the transaction from the bank of the depositor.

The following is the process of creating an online electronic check:
Register with site used for payments.
Provide personal information.
May be required to permanently store personal information.
Enter routing transit and bank account details.
The following is the process of converting paper money order to electronic money order:
Paper money order not tied to user/customer's personal bank account.
Paper money order funds secured or backed by paper money order originating company's bank.
User/customer creates own level of user's profile.
User/customer provides limited personal information.
Paper money order is bearer paper: Who possesses it owns it.
16-digit account number tied to the first paper money order used to create the 16-digit account number and any subsequent paper money order used to update or add funds to the account.
NO routing transit and bank account details required.
The security component:—does the algorithm include a security component—or does the security component come into play by way of the program that deals with an electronic money order, instead of an electronic check?
The security components would involve how the algorithm is written and how the program deals with an electronic money order instead of an electronic check. Remember from above how an electronic check is created.
Process of creating an e-check (paper check that converts to an electronic check):
A paper check requires the following information: the date, the amount of the check, a valid signature, the routing or address of the bank where the withdrawal is being made and the account number of the individual writing the check. Once initiated, the trade involves converting the information into electronic form, sending the data, verifying the data and receiving confirmation of the transaction from the bank of the depositor.
Process of Creating an Electronic Check
(Internet-Only-Transfer):
Register with site used for payments
Provide personal information
May be required to permanently store personal information
Enter routing transit and bank account details
Security Components of an Electronic Money Order:
Algorithm Security Aspect:
How the "set of statements or instructions used" process, store, and retrieve the data entered by users/customers.
Program Security Aspect:
1. An electronic check is tied to a user/customer bank account. An electronic money order is not.
2. An electronic check may require a user/customer full name, street and email address, city, state, and zip code. An electronic money order will require a fraction of that information.
3. Some websites require a user/customer to permanently store their personal information to use an electronic check. An electronic money order will require only a fraction of that information.

4. Sometimes a user/customer has to register by telephone and has to identify themselves each time they call to use an electronic check. An electronic money order will not require this.

5. With an electronic check there can be excessive cash withdrawal from the checking account that can be difficult to dispute and recover. Electronic money order erroneous charges to the account number will not be difficult to dispute and recover.

Is the user/customer account created with an electronic money order available in perpetuity?

Yes, the user/customer account created with an electronic money order would be available in perpetuity when the user/customer adds time and money (funds) to the user/customer account. This can be done by the user/customer replenishing spent money (funds) by purchasing more (any type) of paper money order and updating (reloading) the user/customer account.

If the money order is a paper document, how does the transaction allow for electronic storage of funds?

The money order is a paper document but the transaction allows for electronic storage of funds.

Let us look at the process of creating an e-check (paper check that converts to an electronic check). A person goes to SEARS to buy some shoes. After selecting his shoes he goes to cash register. He writes a paper check and gives it to the cashier. The cashier runs the check through the cash register. Note: some stores have other devices they run a paper check through for payment. If there are sufficient funds in the customer's bank account payment is approved; SEARS gets payment and the customer checking account is debited. The whole process takes a few minutes. The customer gets back a "voided" paper check.

Keeping that concept in mind, this is how the paper money order would be stored electronically: User/customer enters paper money order data through the electronic money order website or downloads a mobile app from the electronic money order website. The electronic money order website bank "communicates" with the paper money order originating company's bank. Remember paper money order funds are secured or backed by the paper money order originating company's bank. Fund are stored in the electronic money order company's bank account and secured or backed by the paper money order originating company's bank and would be available for the user/customer to spend. It should be noted that once communication between banks have authenticated the paper money order, and it has been converted into an electronic money order it becomes "dead" paper, just like a "voided" paper check and cannot be reused.

Do the banks hold money for the money order company in a form that would allow electronic transactions?

Yes, banks hold money for the money order company in a form that would allow electronic transactions as discussed in my explanation of the processes and examples above. See above processes and examples.

Accounts can be accessed by a mobile electronic device, or by any device that can connect to the Internet.

FIG. 1 illustrates that overall concept of the invention. The user 10 goes to a paper money order retail agent 12, which gets the money orders from a paper money order originating company 14, which deposits the funds in a paper money order originating bank 16. The customer goes to the electronic money order company's website 18. The funds are transferred from the paper money order originating bank to the electronic money order company bank 20.

Figure 2:
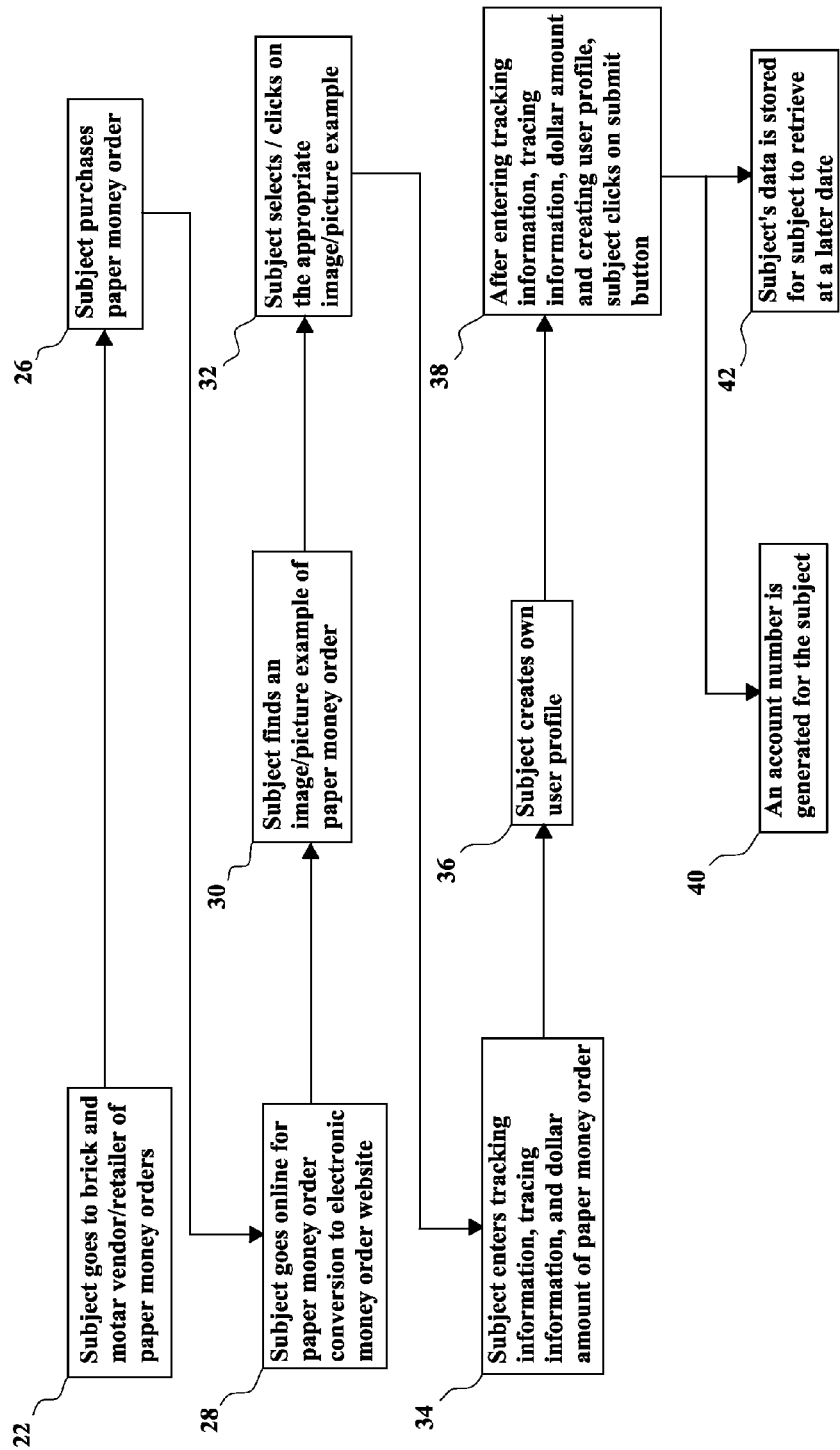
FIG. 2 is a flowchart of the basic concept of the invention.

FIG. 2 illustrates the basic process. The subject (customer) goes to a brick and motar vendor/retailer of paper money orders 22, where he purchases a paper money order 26. He then goes online to a website to convert the paper money order to an electronic money order 28. He finds an image or picture (icon) on the website that matches the paper money order he has purchases 30. He clicks on the appropriate icon 32. He then enters the tracking information, tracing information, and dollar amount from the paper money order 34. The customer creates his own user profile 36, and clicks on the submit button 38. An account number is then created for the customer 40, and his data is stored so that he can retrieve it at a later date.

Figure 3:
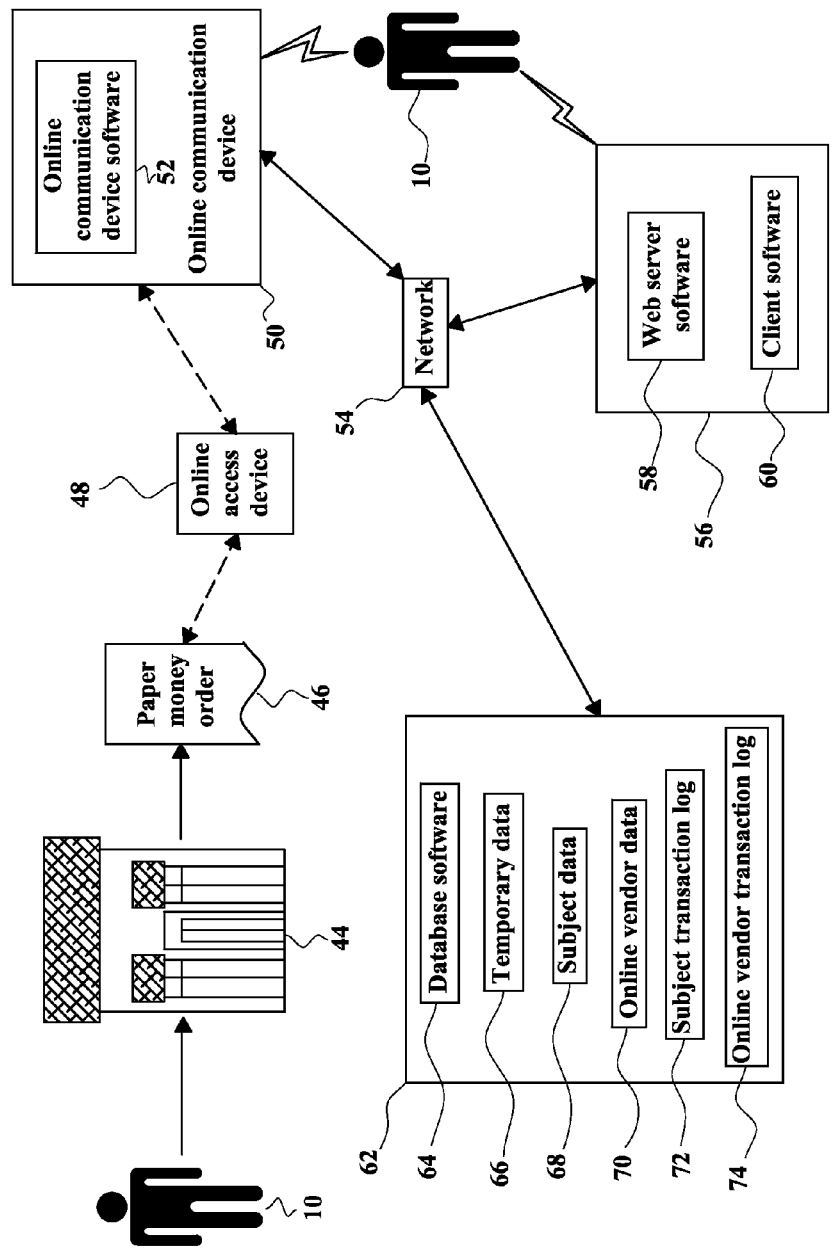
FIG. 3 is a graphical representation of the network architecture of the invention.

FIG. 3 illustrates the network architecture of the invention. The user 10 goes to a brick and mortar retailer/vendor 44, purchases a paper money order 46, and uses an online access device 48 and/or an online communication device 50 having software 52 to connect with a network 54. The user communicates with the electronic money order company's computer 56 programmed with webserver software 58 and client software 60. The company's computers have a database 62 including database software 64, temporary data 66, subject data 68, online vendor data 70, a subject transaction log 72, and an online vendor transaction log 74.

Figure 4:
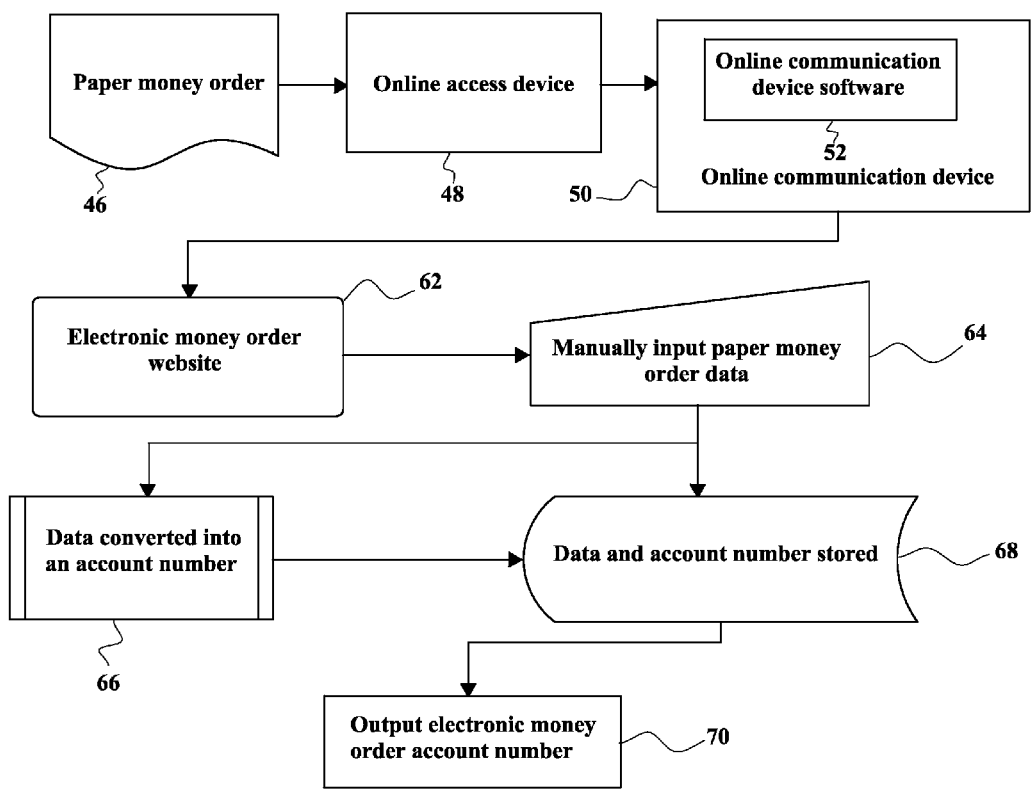
FIG. 4 is a flowchart of the process of converting a paper money order to an electronic money order.

FIG. 4 illustrates the process of converting a paper money order to an electronic money order. The customer obtains a paper money order 46, uses an online access device 48 and/or an online communication device 50 with software 52 to access the electronic money order website 62. The customer manually inputs or scans the paper money order data 64. A customer account with an account number is created 66, and the data and account number are stored 68. The electronic money order account number is then outputted 70.

Figure 5:
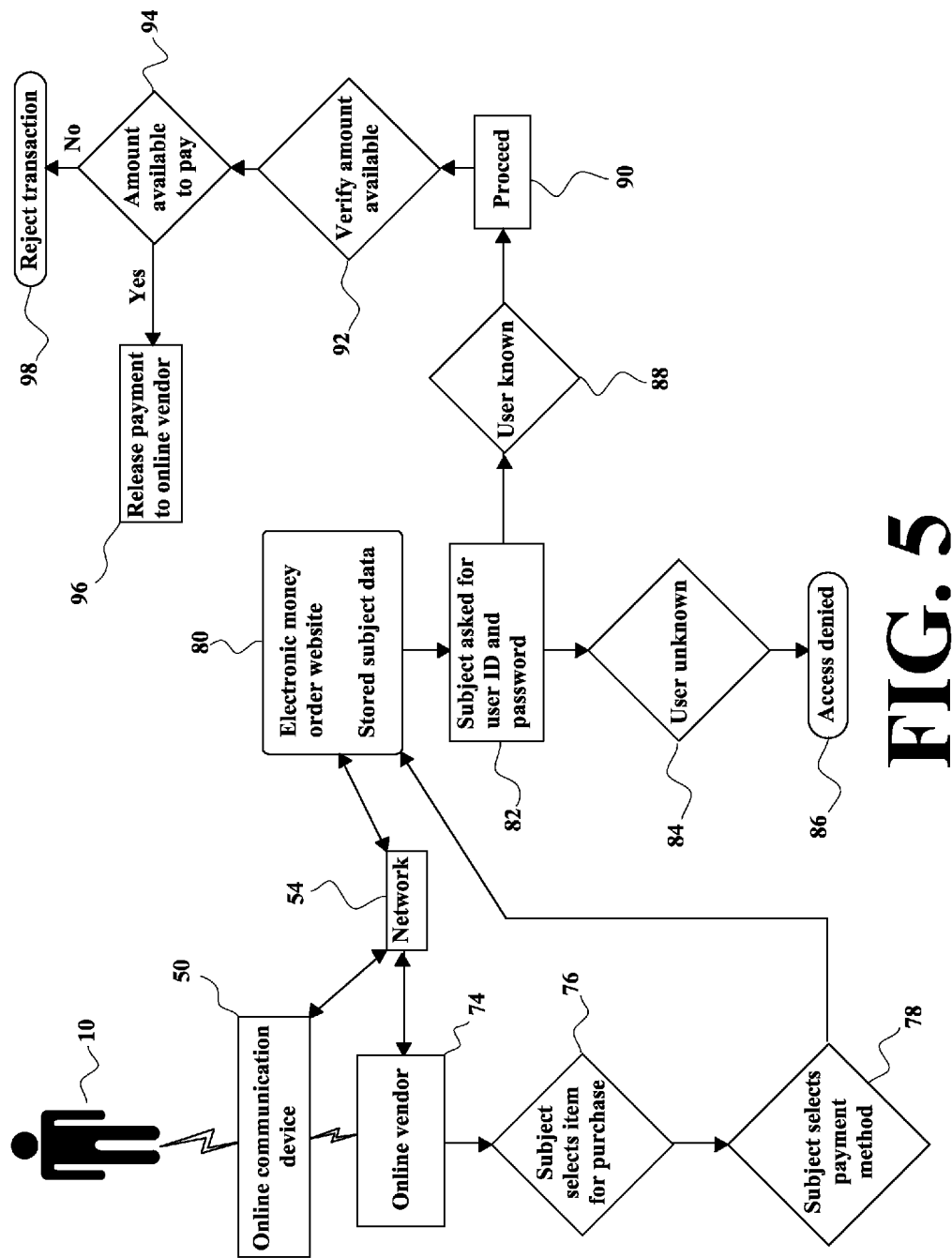
FIG. 5 is a flowchart of an online purchase transaction with an electronic money order.

FIG. 5 illustrates an online purchase transaction using the electronic money order. The customer 10, using an online communications device 50, connects to a network 54 and communicates with an online vendor 74 through its website. The customer selects an item for purchase 76 and selects a payment method 78. If payment is made by electronic money order, it is through the electronic money order website or mobile app with the customer's stored data 80. The customer is asked for his user ID and password 82. If the user ID and password entered are not correct 84, access is denied 86. If the user. ID and password entered are correct 88, then the transaction proceeds 90. The amount available in the customer's account is verified 92. If there is enough money in the account to pay for the transaction 94, then payment is released to the online vender 96. Otherwise, the transaction is rejected 98.

Figure 6:
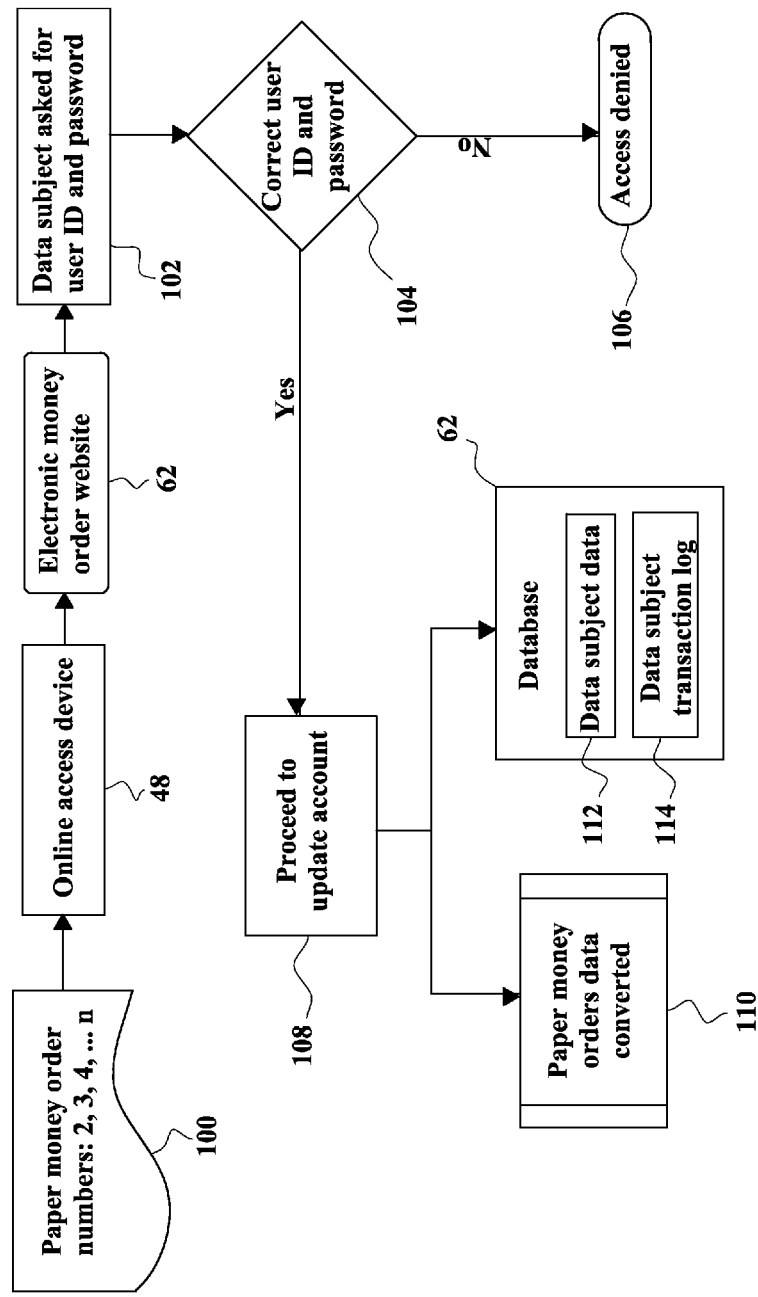
FIG. 6 is a flowchart of the process of adding money and time to an electronic money order account.

FIG. 6 illustrates the process of adding money and time to the electronic money order account. Paper money orders 2, 3, 4, etc. through n are processed using an online access device 48 to log on to an electronic money order website 62, where the customer is asked for his user ID and password 102. If the correct user ID and password 104 is not given, access is denied 106. If they are correct, then the customer's account is updated 108. Data from the paper money orders is used to convert them to electronic money orders 110. The database 62 contains the customer's data 112 and a transaction log for the customer 114.

It is to be understood that the present invention is not limited to the embodiments described above, but encompasses any and all embodiments within the scope of the following claims.

I claim:

1. A method for converting paper money orders to electronic money orders comprising the steps of:

an account is created for a customer, with a username and password by which the customer can access the account;

the dollar value, tracking number, and tracing number of one or more paper money orders are received on-line from the customer;

funds from the paper money orders are deposited in the account; and the funds in the account are made available to the customer for the issuance of one or more electronic money orders;

wherein examples of money orders are displayed on a website, and the customer selects one that resembles the paper money order that the customer has, before entering its dollar value, tracking number, and tracing number.

2. The method for converting paper money orders to electronic money orders according to claim 1, further comprising the step of:

the purchase of the paper money order by the customer.

3. The method for converting paper money orders to electronic money orders according to claim 1, further comprising the step of:

assigning a number to the account.

4. The method for converting paper money orders to electronic money orders according to claim 1, further comprising the step of:

the issuance of one or more electronic money orders from the funds in the account.

5. The method for converting paper money orders to electronic money orders according to claim 4, further comprising the step of:

the use of the electronic money orders by the customer to make one or more on-line purchases.

6. The method for converting paper money orders to electronic money orders according to claim 4, further comprising the step of:

the use of the electronic money orders by the customer to pay one or more bills on-line.

7. The method for converting paper money orders to electronic money orders according to claim 1, wherein a website is used by the customer to access the account, enter the dollar value, tracking number, and tracing number of one or more paper money orders, and order one or more electronic money orders.

8. The method for converting paper money orders to electronic money orders according to claim 1, wherein the customer may access the account by answering one or more security questions, if they forget their username and password.

9. The method for converting paper money orders to electronic money orders according to claim 1, wherein funds in the account will not be available if they fall below a minimum amount.

10. The method for converting paper money orders to electronic money orders according to claim 1, wherein the customer is charged a one-time fee when the account is created.

11. The method for converting paper money orders to electronic money orders according to claim 1, wherein the customer is charged a periodic maintenance fee.

12. The method for converting paper money orders to electronic money orders according to claim 1, wherein the customer is charged a fee to add money to the account.

13. The method for converting paper money orders to electronic money orders according to claim 1, wherein funds are made available from each paper money order, only after the paper money order clears a bank that issued it.

14. The method for converting paper money orders to electronic money orders according to claim 13, wherein funds are made available from each paper money order, only after the funds are settled in a bank that issues the electronic money order.

15. The method for converting paper money orders to electronic money orders according to claim 1, wherein customers can check their account balances at any time.

16. The method for converting paper money orders to electronic money orders according to claim 1, wherein the customer selects an electronic money order icon to make a payment.

17. The method for converting paper money orders to electronic money orders according to claim 1, wherein a database on one or more computers stores account data.

18. The method for converting paper money orders to electronic money orders according to claim 1, wherein a database on one or more computers stores transaction logs.

19. The method for converting paper money orders to electronic money orders according to claim 1, wherein the customer accesses the account through the Internet.

20. The method for converting paper money orders to electronic money orders according to claim 1, comprising the further steps of:

instructing the user to create a user profile; and giving the customer the option to create their own level of personal information that they want on the web.

* * * * *